United States Patent [19]

Mandet et al.

[11] Patent Number: 5,074,109

[45] Date of Patent: Dec. 24, 1991

[54] LOW PRESSURE TURBINE ROTOR SUSPENSION IN A TWIN HUB TURBO-ENGINE

[75] Inventors: Gérard M. F. Mandet, Fericy; Jacques R. Serre, Melun, both of France

[73] Assignee: Societe Nationale d'Etude et de Construction de Moteurs d'Aviation "S.N.E.C.M.A.", Paris, France

[21] Appl. No.: 495,992

[22] Filed: Mar. 20, 1990

[30] Foreign Application Priority Data

Mar. 22, 1989 [FR] France .............................. 89 03839

[51] Int. Cl.⁵ .............................................. F02C 3/10
[52] U.S. Cl. ................................. 60/39.161; 60/39.31
[58] Field of Search ........... 60/39.161, 39.162, 39.163, 60/39.31; 415/122.1

[56] References Cited

U.S. PATENT DOCUMENTS

| 2,933,893 | 4/1960 | Blyth et al. | 60/39.31 |
|---|---|---|---|
| 3,546,880 | 12/1970 | Schwaan | 60/39.161 |
| 3,692,436 | 9/1972 | Connor et al. | |
| 3,792,586 | 2/1974 | Kasmanik et al. | 60/39.161 |
| 3,823,553 | 7/1974 | Smith | 60/39.31 |

FOREIGN PATENT DOCUMENTS

| 2611682 | 9/1977 | Fed. Rep. of Germany . |
|---|---|---|
| 1326181 | 6/1962 | France . |
| 1462062 | 12/1965 | France . |
| 1527370 | 6/1967 | France . |
| 2605679 | 4/1988 | France ............................. 60/39.161 |
| 511597 | 8/1939 | United Kingdom . |

Primary Examiner—Louis J. Casaregola
Attorney, Agent, or Firm—Oblon, Spivak, McClelland, Maier & Neustadt

[57] ABSTRACT

The suspension of the rotor of the low pressure turbine of a twin hub turbo-engine includes a cylindrical support arranged coaxially with the axis of the turbine and firmly attached to the stator by radial spacers at the rear of the turbine, the rotor being carried on a front bearing and a rear bearing both mounted on the cylindrical support.

3 Claims, 2 Drawing Sheets

LOW PRESSURE TURBINE ROTOR SUSPENSION IN A TWIN HUB TURBO-ENGINE

BACKGROUND OF THE INVENTION

1. Field of the Invention

The present invention relates to the suspension of the rotor of the low pressure turbine of a twin hub turbo-engine.

2. Summary of the Prior Art

French Patent No. 1 462 062 discloses a gas turbine engine with a rear mounted fan in which the fan comprises a rotor having a single stage of blades connected to short front and rear shafts which are respectively supported by bearings. The bearings themselves are carried on the stationary structure of the turbofan through the intermediary of struts or fins disposed upstream and downstream of the turbofan.

French Patent No. 1 527 370 discloses a turbojet engine with a front mounted fan in which the low pressure turbine rotor comprises several stages of blades fixed to a drum carried at its two ends by conical elements journalled in roller bearings carried respectively on radial spacers by means of conical support members placed upstream and downstream of the low pressure turbine, the spacers being attached to the casing of the engine.

The suspension systems for the rotors of the low pressure turbines disclosed in these two documents comprise elements for the suspension of said rotor disposed upstream and downstream of the low pressure turbine, which involves problems and expense in assembling and dismantling the engine.

To facilitate the assembly and dismantling of the engine, it is known that the radial spacers placed upstream of the low pressure turbine may be dispensed with by using an inter-shaft bearing between the high pressure hub and the shaft of the low pressure turbine.

However, supporting the low pressure rotor solely from the rear of the low pressure turbine confers on the low pressure shaft a major degree of flexibility which can generate excessive vibrations in this turbine, and there is a danger of vibratory energy being transmitted from one hub to the other by virtue of the fact that the high pressure hub is carried on the low pressure shaft.

It is also known that the radial spacers placed downstream of the low pressure turbine may be dispensed with by having the low pressure turbine supported only at the front by means of an inter-turbine casing sited between the low pressure and high pressure turbines. This type of mounting can also engender undesirable vibrations, particularly if the low pressure turbine comprises a large number of stages.

SUMMARY OF THE INVENTION

It is an object of the present invention to provide a new way of suspending the low pressure turbine of a twin hub turbo-engine which overcomes the disadvantages already mentioned and which, amongst other things, enables the low pressure turbine rotor to be better supported so as to avoid excessive vibration of the low pressure turbine whilst facilitating the assembly and stripping down of the engine.

To this end, according to the invention, there is provided a turbo-engine of the twin hub type including a high pressure turbine, a hollow shaft driven by said high pressure turbine, a low pressure turbine disposed downstream of said high pressure turbine, a tubular shaft driven by said low pressure turbine and housed at least in part within said hollow shaft, and an inter-shaft bearing between said tubular shaft and said hollow shaft, said low pressure turbine comprising a stator and a rotor, a front bearing supporting said rotor at the front thereof, a rear bearing carried by said stator and supporting said rotor at the rear thereof, a cylindrical support disposed coaxially with said low pressure turbine and extending along the greater part of the length of said low pressure turbine, and radial spacers arranged downstream of said low pressure turbine firmly fixing said cylindrical support to said stator, said rotor of the low pressure turbine comprising a drum, a plurality of rows of blades fixed on said drum, and front and rear bearing mounts carried at the front and rear ends respectively of said drum, said front bearing mount being fixed to said tubular shaft of said low pressure turbine, said front bearing being disposed between said front bearing mount and said cylindrical support, and said rear bearing mount being supported by said rear bearing.

Preferably the cylindrical support serves to carry the rear bearing, said bearing being disposed between said cylindrical support and said rear bearing mount.

With this structure, the low pressure turbine rotor is supported by two bearings which are carried on the cylindrical support member which is secured to the low pressure turbine stator at the rear of the low pressure turbine, thus avoiding the use of upstream spacers connected to the interturbine casing, and hence removing the difficulties presented by the assembly and dismantling of such upstream spacers without resulting in unwanted flexing of the rotor which generates vibrations.

In one embodiment of the invention the cylindrical support provides an external bearing surface for the front bearing, which is disposed around said cylindrical support.

In an alternative embodiment the cylindrical support has a longitudinal bore provided at least at the front end of said support, and the front bearing is mounted within said longitudinal bore.

Other features and advantages of the invention will become apparent from the following description of two embodiments of the invention with reference to the attached drawings.

A more complete appreciation of the invention and many of the attendant advantages thereof will be readily obtained as the same becomes better understood by reference to the following detailed description when considered in connection with the accompanying drawings, wherein:

DESCRIPTION OF THE PREFERRED EMBODIMENTS

Figure 1:
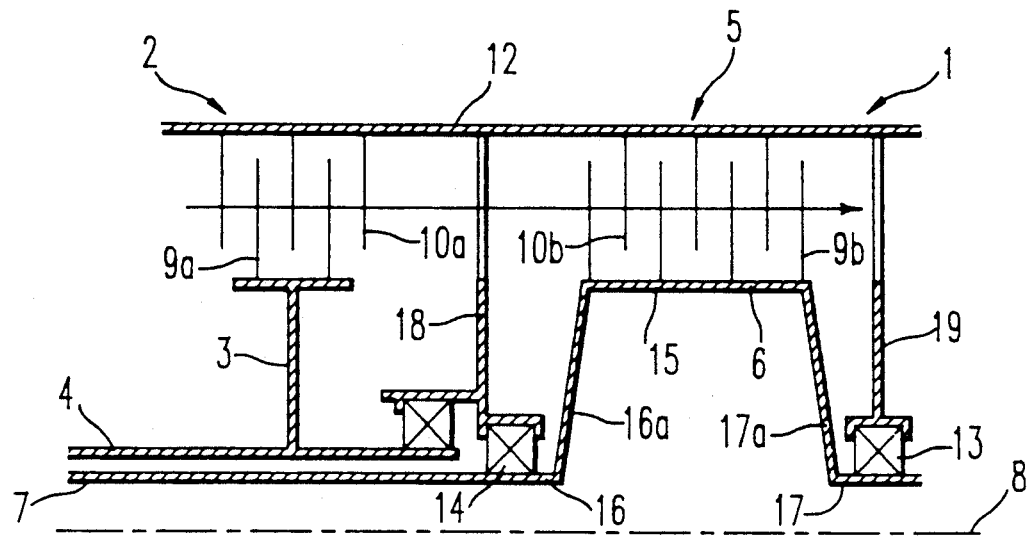
FIG. 1 represents diagrammatically the principles of one known mode of suspending the rotor of the low pressure turbine in a twin hub turbo-engine.

A twin hub turbo-engine 1, such as a turbojet or a gas turbine engine, comprises a high pressure turbine 2 whose rotor 3 comprises a hollow, high pressure shaft 4 designed to drive a compressor (not shown). Downstream of the high pressure turbine 2 is disposed a low pressure turbine 5 which is supplied with hot gases from the outlet of the high pressure turbine 2 and which has a rotor 6 driving a tubular, low pressure shaft 7 which is disposed at least in part inside the hollow high pressure shaft 4 and which, in turn, drives a fan (not shown) which may be placed upstream of the compressor. The rotors 3 and 6 of the turbines 2 and 5 are driven to rotate about the axis 8 of the turbo-engine 1 by the hot gases from the combustion chamber (not shown) situated between the compressor and the high pressure turbine, thanks to the rows of blades 9a and 9b spaced axially on the rotors 3 and 6 and alternating with the rows of stationary blades 10a and 10b mounted on the stator 11 of the high pressure turbine 2 and on the stator 12 of the low pressure turbine 5 respectively. The stators 11 and 12 form the outer shell and casing of the turbo-engine 1.

The rotor 6 of the low pressure turbine 5 is supported downstream by a rear bearing 13 carried on the stator 12, and upstream by a front bearing 14 mounted on the shaft 7 of the low pressure turbine 5.

FIG. 1 shows a known arrangement for the suspension of the low pressure turbine. In this arrangement, the rotor 6 of the low pressure turbine is formed as a drum 15 on which are fixed rows of blades 9b and which is supported by a front bearing mount 16 and a rear bearing mount 17 connected to the drum by conical or transverse elements 16a, 17a, the front bearing mount 16 being firmly attached to the low pressure shaft 7. The front bearing 14 is mounted on the front bearing mount 16 or on the low pressure shaft 7 and bears on the stator 12 through the intermediary of spacers 18 disposed radially between the two turbines 2 and 5. The rear bearing 13 is mounted on the rear bearing mount 17 and bears on the stator 12 through spacers 19 disposed radially downstream of the low pressure turbine 5.

Figure 2:
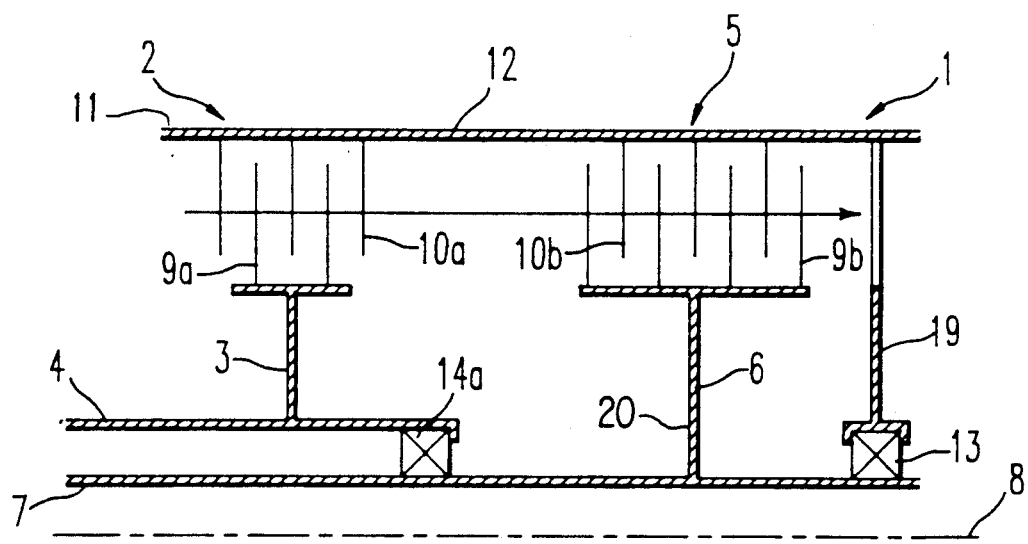
FIG. 2 is a diagram showing the principles of another known mode of suspending the low pressure turbine rotor.

FIG. 2 shows another known arrangement for the suspension of the rotor 6 of the low pressure turbine 5, the rotor 6 comprising a disc 20 connected to the low pressure shaft 7. The rear bearing 13 is sited between the low pressure shaft 7 and the radially arranged spacers 19 downstream of the low pressure turbine 5 and fixed to the stator 12. In this suspension arrangement the front bearing is an inter-shaft bearing 14a sited between the high pressure shaft 4 and the low pressure shaft 7.

The aim of the present invention is to enable the front bearing 14 to be supported by the stator 12 of the low pressure turbine 5 without the assistance of spacers 18 arranged radially between the two turbines 2 and 5.

Figure 3:
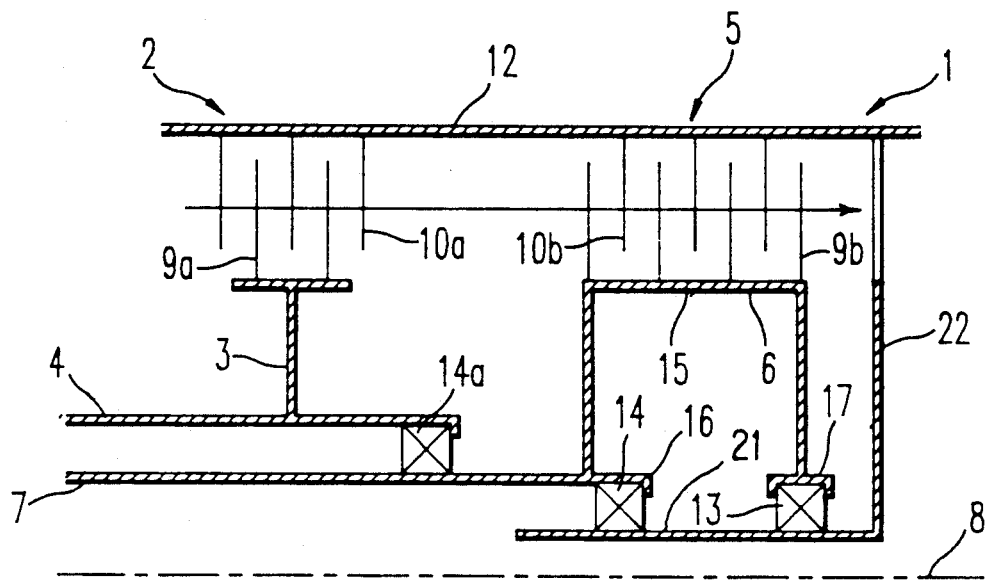
FIG. 3 represents diagrammatically the principles of the mode of suspending the low pressure turbine rotor in accordance with one embodiment of the invention.
Figure 4:
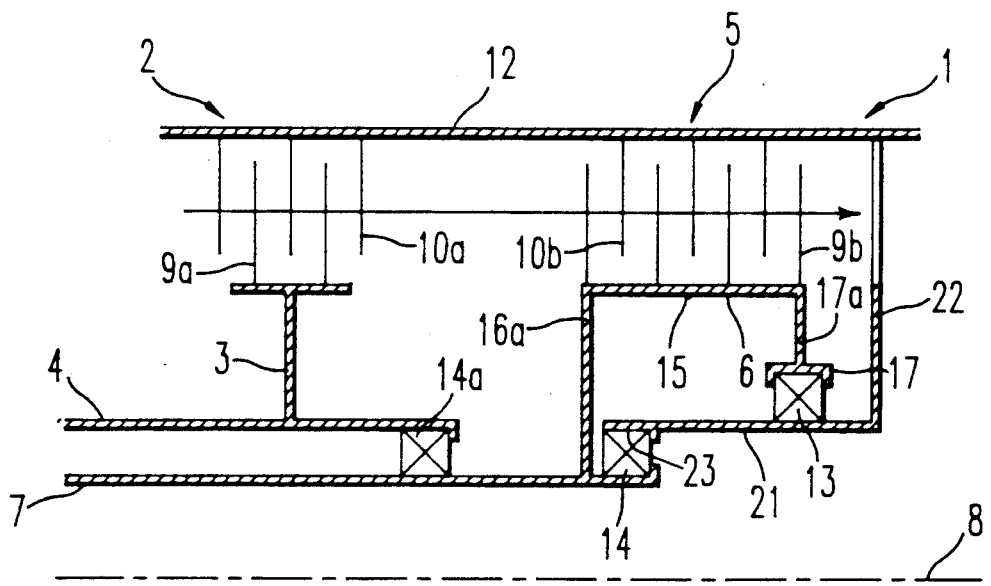
FIG. 4 is a view similar to that of FIG. 3 but showing a second embodiment of the invention.

As may be seen from FIGS. 3 and 4 representing diagrammatically two embodiments of the invention, a cylindrical support 21 is disposed longitudinally along the axis 8 of the turbo-engine 1. The support 21 extends along almost the entire length of the low pressure turbine 5 and is firmly fixed to the stator 12 of the low pressure turbine 5 by evenly distributed radial spacers 22 downstream of the low pressure turbine 5. The front bearing 14 is interposed between the support 21 and the low pressure shaft 7, and the rear bearing 13 bears upon the support 21 as shown in FIGS. 3 and 4.

More particularly, the embodiments shown in FIGS. 3 and 4 relate to a rotor 6 of a low pressure turbine comprising a drum 15 carried by transverse elements 17a and 16a, respectively, on a rear bearing mount 17 and a front bearing mount 16 firmly attached to the low pressure shaft 7. The rear bearing 13 is placed between the rear bearing mount 17 and the support 21. Advantageously, the support 21 is provided with a longitudinal bore 23 extending at least over its front part, and the front bearing 14 is placed between the front bearing mount 16 and the support 21, either surrounding the support 21 as in the FIG. 3 embodiment or being disposed within the bore 23 of the support as in the FIG. 4 embodiment.

In both embodiments the rotor 3 of the high pressure turbine 2 is supported at the rear by means of an inter-shaft bearing 14a disposed between the high pressure shaft 4 and the low pressure shaft 7.

We claim:

1. A turbo-engine of the twin hub type including a high pressure turbine, a hollow shaft driven by said high pressure turbine, a low pressure turbine disposed downstream of said high pressure turbine, a tubular shaft driven by said low pressure turbine and housed at least in part within said hollow shaft, and an inter-shaft bearing positioned between said tubular shaft and said hollow shaft, wherein said low pressure turbine comprises:
   a stator and a rotor,
   a front bearing supporting said rotor at a front portion thereof,
   a rear bearing carried by said stator and supporting said rotor at the rear thereof,
   a cylindrical support disposed coaxially with said low pressure turbine and extending along the greater part of the length of said low pressure turbine, and
   radial spacers arranged downstream of said low pressure turbine firmly fixing said cylindrical support to said stator,
   said rotor of the low pressure turbine comprising a drum having transverse elements, a plurality of rows of blades fixed on said drum, and front and rear bearing mounts carried at the front and rear ends respectively of said drum by said transverse elements, said front bearing mount being fixed to said tubular shaft of said low pressure turbine, said front bearing being disposed between said front bearing mount and said cylindrical support, and said rear bearing mount being supported by said rear bearing wherein said rear bearing is disposed between said cylindrical support and said rear bearing mount.

2. A turbo-engine in accordance with claim 1, wherein said cylindrical support has a longitudinal bore provided at least at the front end of said support, and said front bearing is mounted within said longitudinal bore.

3. A turbo-engine in accordance with claim 1, wherein said front bearing is mounted around the outside of said cylindrical support.

* * * * *